United States Patent [19]

Itami et al.

[11] Patent Number: 5,153,775
[45] Date of Patent: Oct. 6, 1992

[54] DISPLAY APPARATUS INCLUDING TWO PRISMS WITH OPPOSITELY DIRECTED APEX ANGLES

[75] Inventors: Kazuhiro Itami; Yasuyoshi Oota, both of Susono, Japan

[73] Assignee: Yazaki Corporation, Tokyo, Japan

[21] Appl. No.: 642,328

[22] Filed: Jan. 17, 1991

[30] Foreign Application Priority Data

Jan. 18, 1990 [JP] Japan .................... 2-2693[U]
Jul. 25, 1990 [JP] Japan .................... 2-78208[U]

[51] Int. Cl.$^5$ .................... G02B 27/10; G02B 5/04
[52] U.S. Cl. .................... 359/637; 359/613; 359/837
[58] Field of Search ........... 350/637, 638, 629-634, 350/737, 837, 834, 613

[56] References Cited

U.S. PATENT DOCUMENTS

| | | | |
|---|---|---|---|
| 2,096,425 | 10/1937 | Dixon et al. | 359/638 |
| 3,276,813 | 10/1966 | Shaw | 359/630 |
| 3,393,034 | 7/1968 | Imai | 359/613 |
| 3,806,253 | 4/1974 | Amos | 359/638 |
| 4,697,881 | 10/1987 | Brown | 359/613 |
| 4,726,662 | 2/1988 | Cromack | 359/601 |
| 4,787,711 | 11/1988 | Suzuki et al. | 359/631 |
| 4,969,730 | 11/1990 | van den Brandt | 359/633 |
| 4,986,631 | 1/1991 | Aoki et al. | 359/833 |

FOREIGN PATENT DOCUMENTS

329110 8/1989 European Pat. Off. ............ 359/630

*Primary Examiner*—Jon W. Henry
*Attorney, Agent, or Firm*—Armstrong & Kubovcik

[57] ABSTRACT

A display apparatus for a vehicle or the like prevents occurrence of a washout phenomenon or the like and is stable and high in visual observation even in an intense external light condition. The display apparatus includes a display unit, and a prism having first and second mutually intersecting faces opposed to the display unit such that light from the display unit is emitted by way of the prism to provide a display of a display image of the display unit. The prism is disposed such that incidence light to the first face thereof remote from the display unit is totally reflected by the second face thereof adjacent the display unit to restrict the incidence angle to the prism of light which can pass through the prism toward the display unit. A second prism, having a prism apex angle substantially equal to or greater than the prism apex angle of the first prism, is disposed between the display unit and the first prism such that the apex angles of the prisms are directed opposite to each other to cancel the refracting actions of the prisms to light from the display unit with each other.

9 Claims, 10 Drawing Sheets

DISPLAY APPARATUS INCLUDING TWO PRISMS WITH OPPOSITELY DIRECTED APEX ANGLES

BACKGROUND OF THE INVENTION

1. Field of the Invention

This invention relates to a display apparatus suitable for use in an environment in which it is likely influenced by external light such as a display apparatus for a vehicle.

2. Description of the Prior Art

Figure 11:
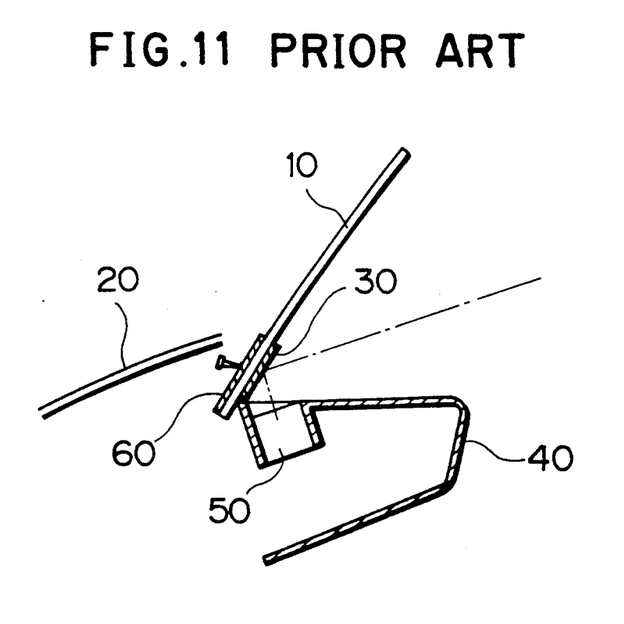
FIG. 11 is a diagrammatic representation showing a conventional display apparatus for a vehicle.

Various display apparatus for a vehicle are already known, and an exemplary one of such display apparatus is disclosed in Japanese Utility Model Laid-Open No. 14126/1986 and shown in FIG. 11.

Referring to FIG. 11, the display apparatus shown includes a half mirror 30 disposed on an inner face of a windshield 10 of a vehicle at a location below a rear edge of a front hood 20, and a display unit 50 having a display face directed toward the windshield 10 such that, when viewed from a visual point position above a driver's seat of the vehicle, a display image on the display unit 50 may be reflected on and visually observed by way of the half mirror 30. With the display apparatus, the display image appears in the proximity of a field of view of the windshield 10, and accordingly, a so-called head-up display function is obtained wherein movement of a line of sight of a driver is reduced. Further, a ceramic coating 60 is provided in the rear of the half mirror 30, that is, on an outer face of the windshield 10, so that a display image formed on the display unit 50 and reflected by the half mirror 30 may be visually observed on the dark background provided by the ceramic coating 60.

With a display apparatus of the type described just above, however, since the display face of the display unit is directed uprightly, external light such as, for example, light of the sun at a high location or light of a street lamp is sometimes admitted directly to the display face of the display unit through the windshield, which will cause the following problems.

In particular, a display apparatus which makes use of a reflecting face as described above commonly employs a display unit of the self light emitting type such as a fluorescent character display tube or a liquid crystal display unit with a back light. With a display unit of the type mentioned, if intense light is irradiated upon the display face thereof, then a so-called washout phenomenon takes place wherein the brightness at a light emitting portion is reduced relative to that at a no light emitting portion to lower the contrast extremely so that such no light emitting portion may be visually observed or the display image may not be visually observed easily.

In order to eliminate the influence of external light, it seems effective to mount a smoke filter in front of the display face to interrupt intense external light and raise the brightness of light to be emitted from the display unit to raise the contrast. Such a means, however, is disadvantageous in that the output of the display unit must be increased.

Alternatively, louvers or like means are sometimes provided in order to control the incoming direction of external light and the outgoing direction of display light. With such means, angular ranges within which display light and external light passes through the louvers can be set by suitably setting the height and the pitch of the lourvers. However, in order to prevent deterioration of the quality of a display image, the pitch of the louvers must be made small, which makes production of the louvers difficult. Further, since the transmission factor of light through the louvers is rather reduced, the output of the display unit must be raised as much.

SUMMARY OF THE INVENTION

It is an object of the present invention to provide a display apparatus which prevents the occurrence of a washout phenomenon or the like and is stable and high in visual observation.

In order to attain the object, according to the present invention, there is provided a display apparatus which comprises a display unit having a display face for displaying a display image thereon, and a first prism having first and second mutually intersecting faces disposed substantially in an opposing relationship to the display face of the display unit such that light from the display unit is emitted by way of the prism to provide a display of a display image of the display face of the display unit. The first prism is disposed such that incidence light to the first face of the prism, remote from the display unit, is totally reflected by the second face of the prism adjacent the display unit to restrict the incidence angle to the prism of light which can pass through the prism toward the display unit.

With the display apparatus, display light from the display unit is refracted at a refraction angle within a critical angle of the first prism at the second face of the first prism adjacent the display unit and is introduced to the first face of the first prism at which it is refracted when it goes out from the first prism. On the other hand, those beams of light introduced to the first face of the first prism from outside of the first prism, which are introduced at incidence angles greater than the critical angle to the second face of the first prism, are totally reflected by the second face and will not go out of the first prism toward the display unit. Consequently, introduction into the display unit of external light coming in a predetermined direction within a predetermined angular range is reduced or eliminated, thereby preventing possible influence of external light upon the display unit and hence a washout phenomenon and so forth arising from the external light. Accordingly, the display apparatus provides a stabilized display image which can be visually observed readily.

Preferably, the display apparatus further comprises a second prism having a prism apex angle substantially equal to or greater than the prism apex angle of the first prism and disposed between the display unit and the first prism such that the apex angles of the first and second prisms are directed opposite to each other to cancel the refracting actions of the first and second prisms to light from the display unit with each other. Where such a second prism is provided, possible distortion of a display image, which may be caused by refracting actions at the first and second faces of the first prism, is corrected or cancelled. Where the second prism has a suitably adjusted apex angle, a display image of a high display quality free from any multiple image can be obtained without an expensive optical element such as a smoke filter.

The above and other objects, features and advantages of the present invention will become apparent from the

DESCRIPTION OF THE PREFERRED EMBODIMENT

Figure 1:
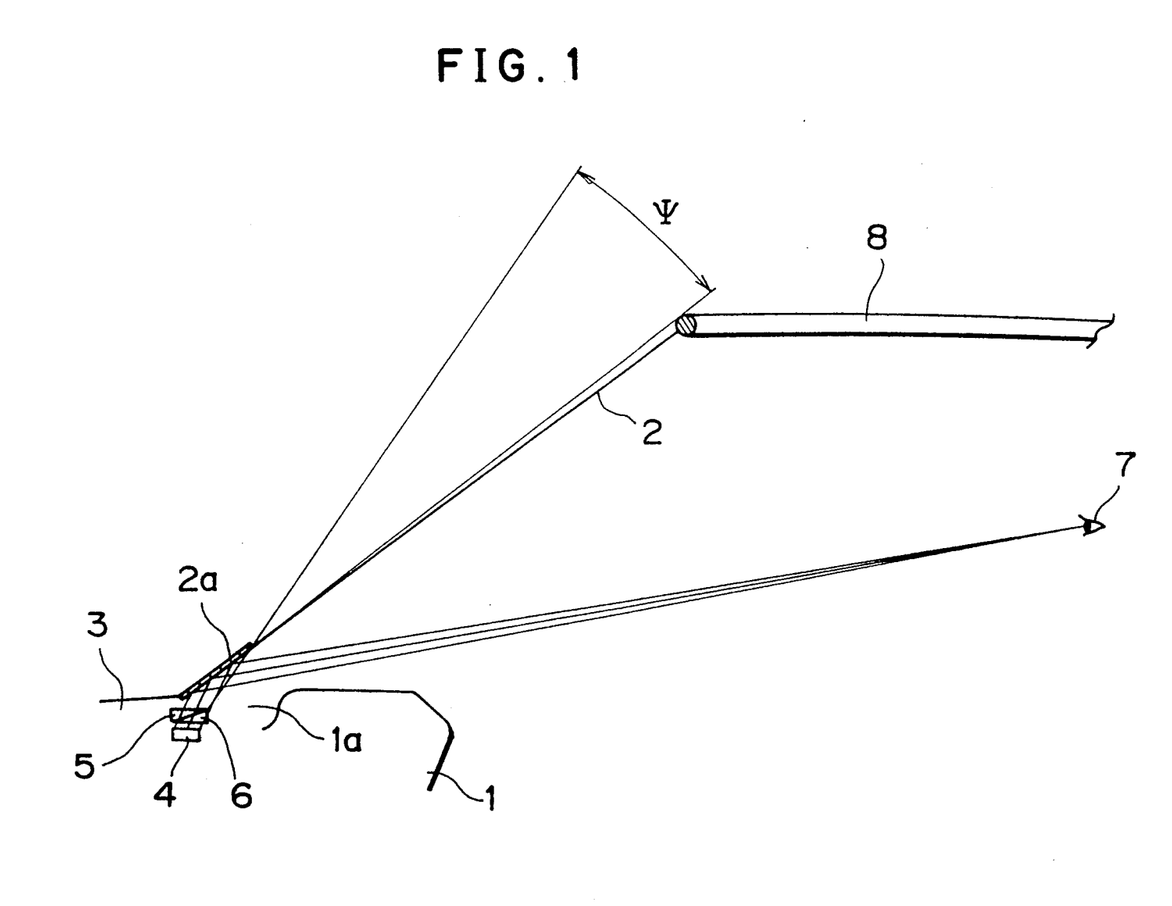
FIG. 1 is a diagrammatic representation of a display apparatus showing a preferred embodiment of the present invention.

Referring first to FIG. 1, there is shown a display apparatus of the reflection type for a vehicle to which the present invention is applied. The vehicle in which the display apparatus is incorporated includes a dashboard 1, a windshield 2 and a front hood 3. A display unit 4 is disposed in the dash board 1 in the proximity of a boundary between the front glass 2 and dashboard 1. The display unit 4 has a display face directed toward the windshield 2 by way of an opening 1a of the dashboard 1 and displays thereon a speed of the vehicle or the number of rotations of an engine (not shown), an amount of remaining fuel, an incompletely closed condition of a door, consumption of oil and so forth. The display unit 4 may be formed, for example, from a fluorescent character display tube (VFT), light emitting diodes (LEDs), or a liquid crystal display device (LCD) with a back light.

An opaque reflecting face 2a is provided by a dark opaque layer or film of black or a like color held between contacting faces of a pair of glass laminates of the windshield 2 at a location of the windshield 2 adjacent the dashboard 1. The reflecting face 2a may alternatively be provided by a layer of a ceramic coating of black or a like color applied to one of contacting faces of a pair of glass laminates of the windshield 2.

A first prism 5 and a second prism 6 each having a wedge-like shape in side elevation are disposed above the display unit 4 such that display light from the display unit 4 may pass through the first and second prisms 5 and 6 and be reflected and directed toward a visual point position 7 above a driver's seat of the vehicle by the reflecting face 2a. It is to be noted that, while external light such as sunlight is admitted into the inside of the vehicle from a range $\psi$ between an upper end of the reflecting face 2a and an end of a ceiling 8 of the room of the vehicle (such range $\psi$ will be hereinafter referred to as external light incidence range $\psi$), such external light is intercepted by the first prism (hereinafter referred to as light intercepting prism) 5 and will not reach the display unit 4 as hereinafter described.

Figure 2A:
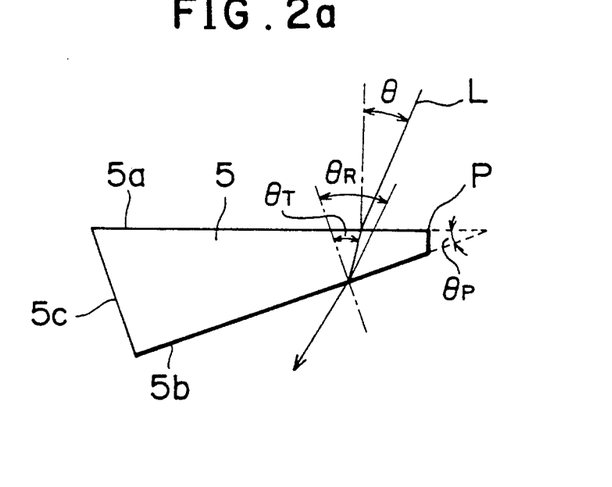
FIGS. 2a, 2b and 2c are diagrammatic representations illustrating operation of a light intercepting prism of the display apparatus of FIG. 1.
Figure 2B:
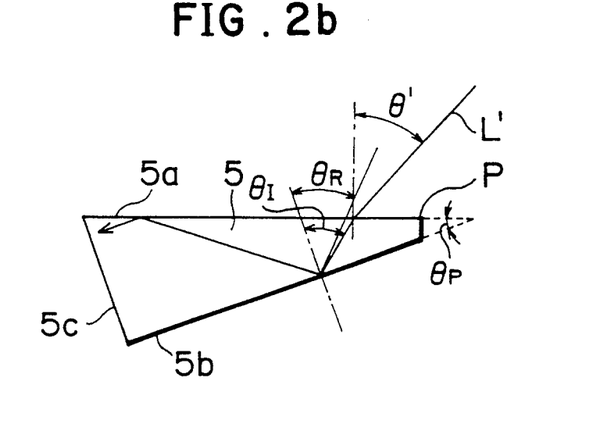
Figure 2C:
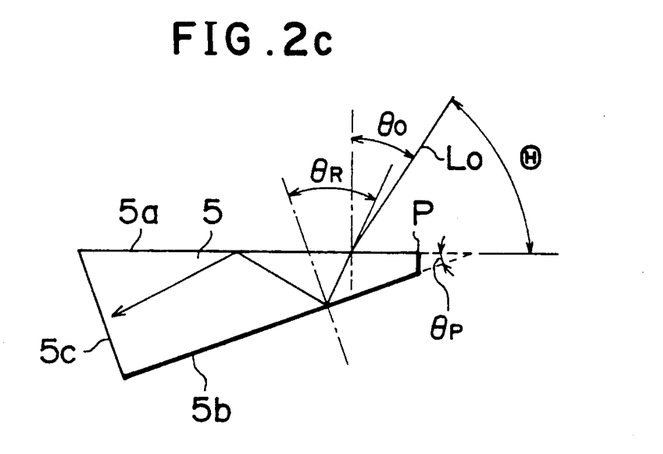

Referring now to FIGS. 2a to 2c, there is illustrated operation of the light intercepting prism 5. It is to be noted that reference character $\theta_P$ denotes a prism apex angle, and $\theta_R$ denotes a critical angle of total reflection which is defined by refractive indices of the prism and air.

Now, if beams of light L and L' are considered which are introduced to a first or A face 5a of the light intercepting prism 5 as seen in FIGS. 2a and 2b, they are refracted at the A face 5a and introduced into the light intercepting prism 5 so that they reach a second or B face 5b of the light intercepting prism 5 which intersects the A face 5a at the prism angle $\theta_P$. Then, such light beam L that makes an incidence angle $\theta_T$ to the B face 5b which is smaller than the critical angle $\theta_R$ as seen in FIG. 2a is refracted at the B face 5b and goes out of the light intercepting prism 5. On the other hand, such light beam L' that makes an incidence angle $\theta_I$ to the B face 5b of the light intercepting prism 5 which is greater than the critical angle $\theta_R$ as seen in FIG. 2b is totally reflected by the B face 5b. Such light beam L' is then reflected by the A face 5a in the light intercepting prism 5 and then introduced at a small incidence angle to a third or C face 5c of the light intercepting prism 5.

Then, where the incidence angle to the A face 5a of the light intercepting prism 5 of a light beam $L_O$ which makes an incidence angle to the B face 5b equal to the critical angle $\theta_R$ as seen in FIG. 5c is represented by $\theta_O$, the incidence angle $\theta$ to the A face 5a of a beam of light which is refracted at the B face 5b and goes out of the light intercepting prism 5 remains, on the side of an apex side end point P of the light intercepting prism 5, within the angular range of $0 \leq \theta < \theta_O$. On the other hand, the incidence angle $\theta'$ to the A face 5a of a light beam which is totally reflected in the light intercepting prism 5 remains, on the apex side end point P side, within another angular range $\Theta$ (hereinafter referred to as total reflection range $\Theta$) of $\theta_O \leq \theta' \leq 90°$.

Figure 3:
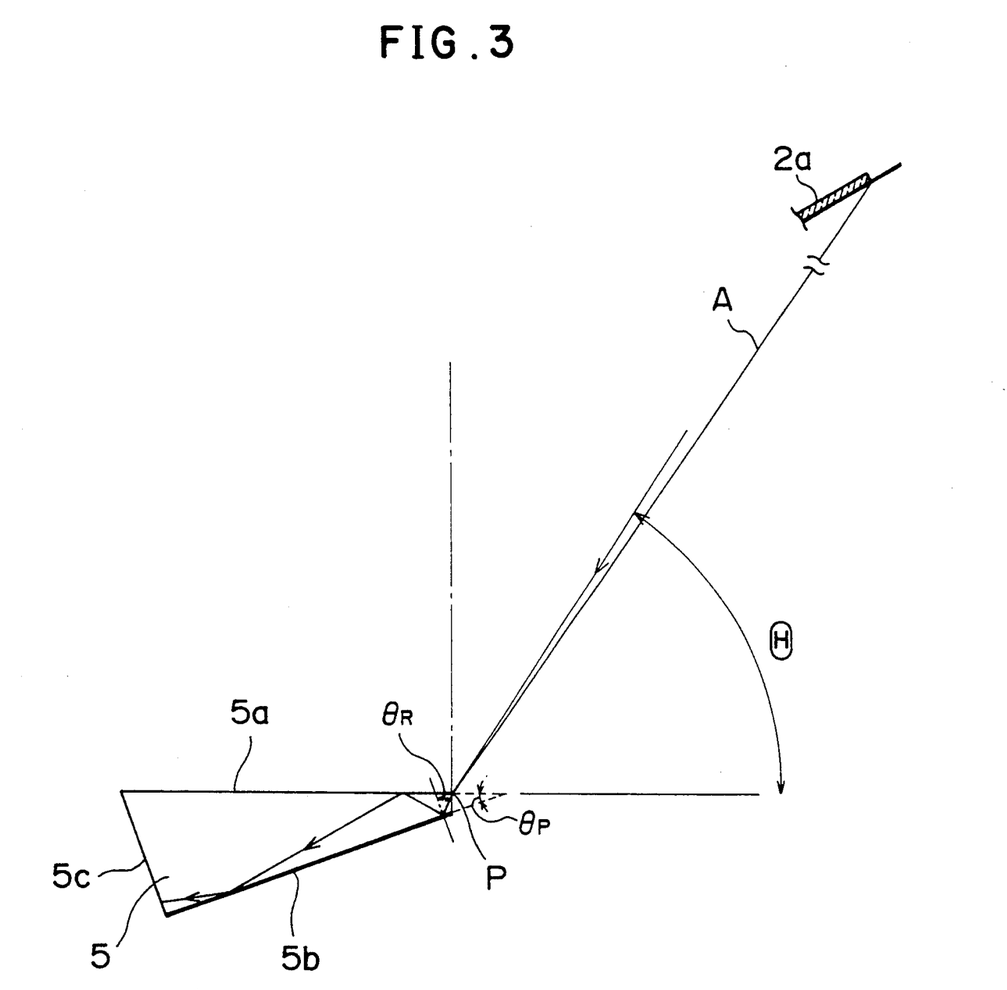
FIG. 3 is a diagrammatic representation illustrating a positional relationship between the light intercepting prism and a reflecting element in the display apparatus of FIG. 1.

Referring now to FIG. 3, there is illustrated a positional relationship between the light intercepting prism 5 and the reflecting face 2a. In particular, the positional relationship between the light intercepting prism 5 and the reflecting face 2a is set such that a line A interconnecting the apex side end point P of the light intercepting prism 5 and an upper end of the reflecting face 2a is included in the total reflection range $\Theta$ at the apex side end point P. It is to be noted that the line A may coincide with an upper limit line of the total reflection range $\Theta$.

With the positional relationship described above, that one of light beams introduced to the A face 5a of the light intercepting prism 5 from the external light incidence range $\psi$ (FIG. 1) which makes the smallest incidence angle passes along the line interconnecting the apex side end point P of the light intercepting prism 5 and the upper end of the reflecting face 2a.

Accordingly, external light such as rays of the sun which is admitted into the inside of the room of the vehicle from the external light incidence range $\psi$ is all totally reflected within the light intercepting prism 5 and cannot reach the display unit 4 as described hereinabove, and consequently, a washout phenomenon of a display image or a like bad phenomenon of external light is prevented. It is to be noted that a black layer is applied to the C face 5c of the light intercepting prism 5 by coating so that light totally reflected by the B face 5b and A face 5a and introduced to the C face 5c is absorbed almost by the black coating layer.

Now, if the incidence angle of an incidence light beam to the A face 5a of the light intercepting prism 5 is represented by $\theta$, the angle of refraction at the A face 5a is represented by $\theta_K$ and the refractive index of the light intercepting prism 5 is represented by $n_P$, then the angle of refraction $\theta_K$ is given by $$\theta_K = \sin^{-1}\left(\frac{\sin\theta}{n_P}\right) \quad (1)$$

and the incidence angle $\theta_I$ to the B face 5b is given by $$\theta_I = \theta_P + \theta_K \quad (2)$$
$$= \theta_P + \sin^{-1}\left(\frac{\sin\theta}{n_P}\right)$$

Meanwhile, a requirement for total reflection to take place at the B face 5b is given by the following expression (3):

$$\theta_R = \sin^{-1}\left(\frac{1}{n_P}\right), \theta_I \geq \theta_R \quad (3)$$

Accordingly, the incidence angle $\theta_O$ to the A face 5a of the light intercepting prism 5 of the light beam $L_O$ which makes a minimum incidence angle within the total reflection range $\Theta$, that is, which makes an incidence angle to the B face 5b equal to the critical angle $\theta_R$, can be calculated in accordance with the expressions (2) and (3) given above.

Figure 4:
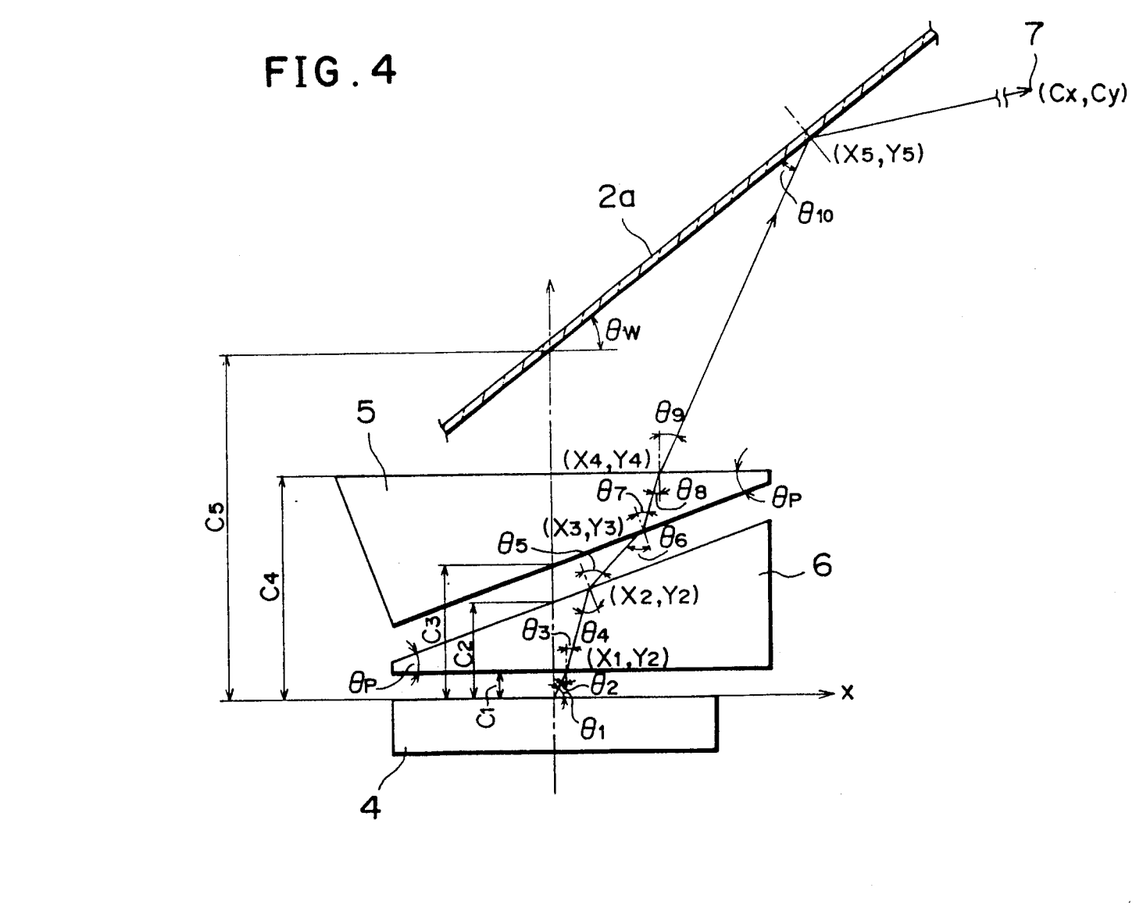
FIG. 4 is a diagrammatic representation illustrating an example of ray tracing in the display apparatus of FIG. 1.
Figure 5:
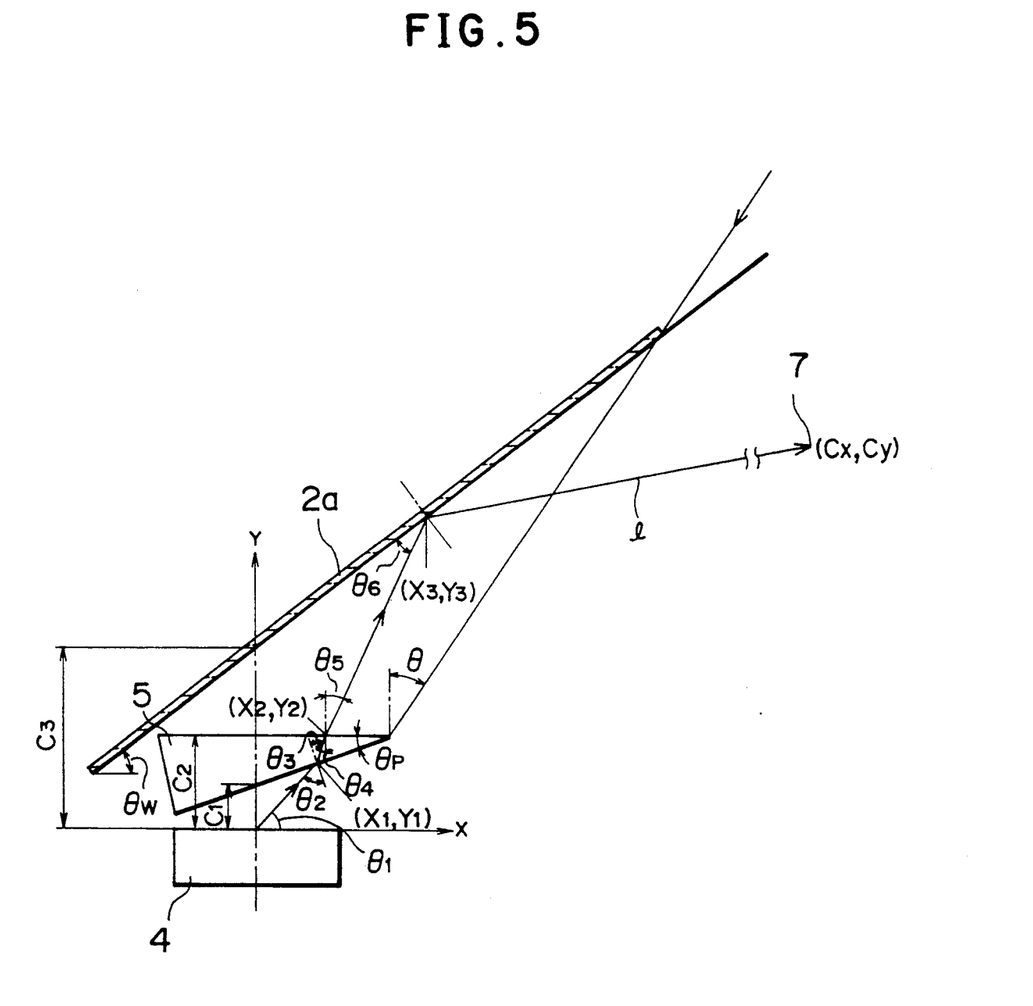
FIG. 5 is a diagrammatic representation illustrating an example of ray tracing where no correcting prism is included.

Referring now to FIG. 4, the second prism (hereinafter referred to as correcting prism) 6 has an apex angle equal to the prism apex angle $\theta_P$ of the light intercepting prism 5 and is disposed such that the refracting operation thereof may cancel the refracting operation of the light intercepting prism 5 with regard to display light from the display unit 4.

Where such correcting prism 6 is not included as shown in FIG. 5, light from the display unit 4 will reach the visual point position 7 along a route l shown in FIG. 5. Now, if attention is paid to that beam of light among beams of light emitted from the display unit 4 which is emitted at an angle of $\theta_1$ with respect to the display face of the display unit 4 and advances along the route l, various angles $\theta_2$ to $\theta_6$ appearing in FIG. 5 can be represented in the following expressions (4):

$$\theta_2 = 90 - \theta_1 + \theta_P \quad (4)$$

$$\theta_3 = \sin^{-1}\left(\frac{\sin\theta_2}{n_P}\right)$$

-continued $$\theta_4 = \theta_3 - \theta_P$$
$$\theta_5 = \sin^{-1}(n_P \sin\theta_4)$$
$$\theta_6 = 90 - \theta_5 - \theta_W$$

where $\theta_W$ is an angle of the reflecting face 2a with respect to the plane of the display face of the display unit 4.

Meanwhile, coordinates of the various refracting and reflecting points are given by the following expressions (5):

$$x_1 = \frac{C_1}{\tan\theta_1(1 - \tan\theta_P/\tan\theta_1)} + x_0 \quad (5)$$

$$y_1 = \frac{C_1}{1 - \tan\theta_P/\tan\theta_1} + y_0$$

$$x_2 = \tan\theta_4(C_2 - y_1) + x_1$$

$$y_2 = C_2$$

$$x_3 = \frac{\tan\theta_5 \tan\theta_W (y_2 - C_3) - x_2 \tan\theta_W}{\tan\theta_W (\tan\theta_5 \tan\theta_W - 1)}$$

$$y_3 = \frac{y_2 \tan\theta_5 \tan\theta_W - C_3 - x_2 \tan\theta_W}{\tan\theta_5 \tan\theta_W - 1}$$

Figure 6:
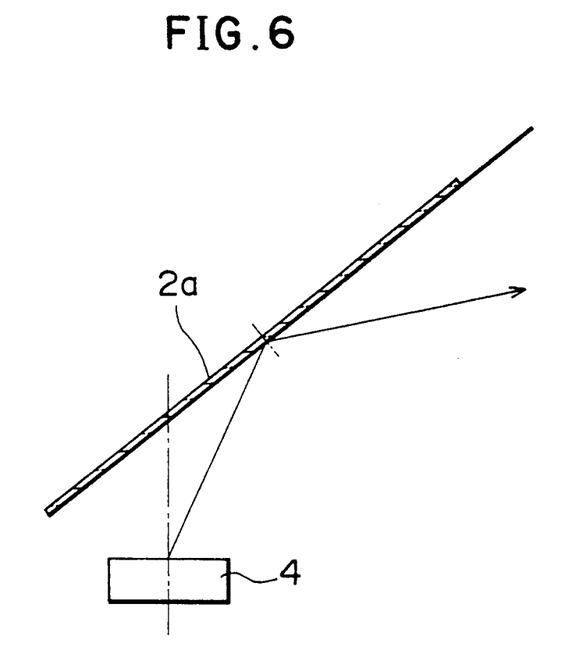
FIG. 6 is a diagrammatic representation illustrating an example of ray tracing where none of a light intercepting prism and a correcting prism is includes.

Further, a requirement for light emitted at the angle $\theta_1$ from the display unit 4 to reach the visual point position 7 is given by the following expression (6):

$$\tan(\theta_W - \theta_6) = \frac{C_y - y_3}{C_x - x_3} \quad (6)$$

where $C_x$ is an x coordinate of the visual point position 7 while $C_y$ is a y coordinate of the visual point position 7.

Where only the light intercepting prism 5 is disposed as described above, it can be seen from the expressions (4) and (5) given above that the position of a display image reflected on the reflecting face 2a is displaced upwardly from the position of such a display image which is reflected on the reflecting face 2a when no prism is disposed above the display unit 4 as shown in FIG. 6, and also the display image is elongated vertically.

Therefore, in the display apparatus of the present embodiment, the correcting prism 6 is disposed between the light intercepting prism 5 and the display unit 4 so that a display image and a display position may be corrected by the correcting prism 6. It is to be noted that an air layer may be provided between the light intercepting prism 5 and the correcting prism 6 as seen in FIG. 4 so as to provide similar conditions for the total reflection of external light by the light intercepting prism 5 as described hereinabove.

Referring to FIG. 4, there is illustrated an example of ray tracing in the display apparatus of the embodiment described above. Referring to FIG. 4, if attention is paid to a beam of light which is emitted at an angle $\theta_1$ from the display unit 4, the various angles $\theta_2$ to $\theta_{10}$ appearing in FIG. 4 are given by the following expressions (7):

$$\theta_2 = 90 - \theta_1$$

-continued $$\theta_3 = \sin^{-1}\left(\frac{\sin\theta_2}{n_P}\right)$$

$$\theta_4 = \theta_3 + \theta_P$$

$$\theta_5 = \sin^{-1}(n_P \sin\theta_4)$$

$$\theta_6 = \theta_5$$

$$\theta_7 = \sin^{-1}\left(\frac{\sin\theta_6}{n_P}\right)$$

$$\theta_8 = \theta_7 - \theta_P$$

$$\theta_9 = \sin^{-1}(n_P \sin\theta_8)$$

$$\theta_{10} = 90 - \theta_9 - \theta_H.$$

Meanwhile, coordinates of the several refracting and reflecting points are given by the following expressions (8):

$$x_1 = C_1 \tan\theta_2 + x_0 \qquad (8)$$

$$y_1 = C_1 + y_0$$

$$x_2 = \tan\theta_3 (C_2 - C_1) + x_1$$

$$y_2 = \tan\theta_P x_2 + C_2$$

$$x_3 = \frac{x_2 - \tan(\theta_6 - \theta_P)(C_3 - y_2)}{1 - \tan(\theta_6 - \theta_P)\tan\theta_P}$$

$$y_3 = \tan\theta_P x_3 + C_3$$

$$x_4 = \tan\theta_8 (C_4 - y_3) + x_3$$

$$y_4 = C_4$$

$$x_5 = \frac{\tan\theta_9 \tan\theta_H \cdot (y_4 - C_5) - x_4 \tan\theta_H}{\tan\theta_H \cdot (\tan\theta_9 \tan\theta_H - 1)}$$

$$y_5 = \frac{y_4 \tan\theta_9 \tan\theta_H - C_5 - x_4 \tan\theta_H}{\tan\theta_9 \tan\theta_H - 1}$$

Further, the requirement for light emitted at the angle $\theta_1$ from the display unit 4 to reach the visual point position 7 above the driver's seat is given by the following expression (9):

$$\tan(\theta_H - \theta_{10}) = \frac{C_y - y_5}{C_x - x_5} \qquad (9)$$

While an air layer is provided between the light intercepting prism 5 and the correcting prism 6 as described hereinabove, a beam of light advancing from the light intercepting prism 5 toward the reflecting face 2a can be aligned, by adjusting the thickness of the air layer, with a beam of light emitted from the display unit 4 so that a display image similar to that obtained in the arrangement shown in FIG. 6 can be visually observed.

It is to be noted that, while distortion of a display image is corrected by the correcting prism 6 in the display apparatus of the embodiment described above, only the light intercepting prism 5 may be involved if the display quality is corrected with some other conditions such that a display pattern of the display unit is designed taking distortion into consideration in advance.

While a display image of the display unit 4 can be visually observed in a distortion free condition due to the light intercepting prism 5 and correcting prism 6 and admission of external light into the display unit 4 can be reduced in this manner, reflection of light by some faces of the prisms 5 and 6 may cause some problems.

Figure 7:
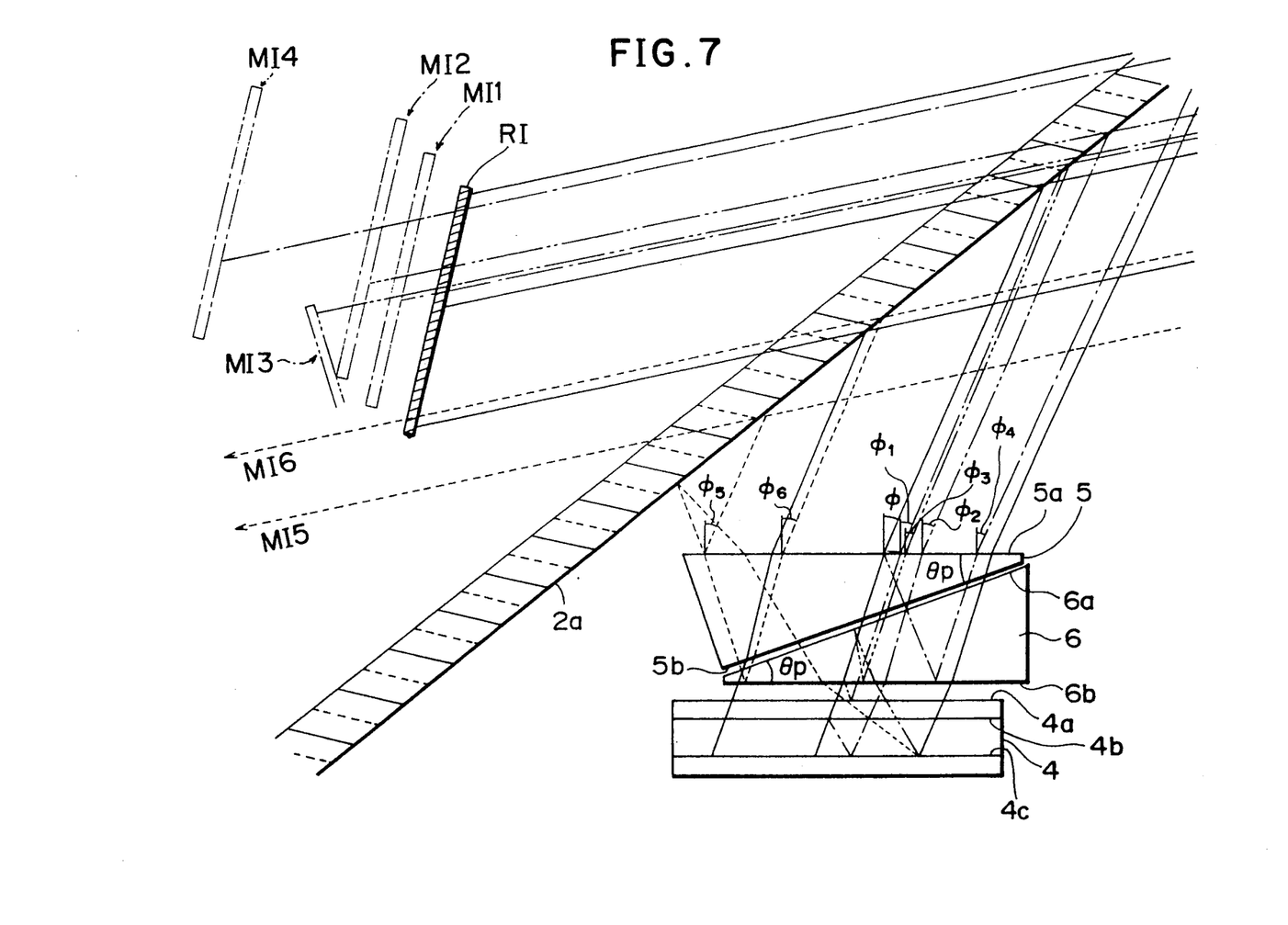
FIG. 7 is a diagrammatic representation illustrating appearance of multiple images in the display apparatus of FIG. 1.

In particular, up to 6 multiple images MI1 to MI6 may be visually observed by a driver in addition to a correct display image RI as seen in FIG. 7. Referring to FIG. 7, the first multiple image MI11 is formed from light emitted from the display unit 4 which is reflected by a face 6b of the correcting prism 6 and then by a face 4a of the display unit 4 and then passes through the correcting prism 6 and light intercepting prism 5 whereafter it is reflected by the reflecting face 2a to form an image. The second multiple image is formed from light emitted from the display unit 4 which is reflected by another face 4b and then by a further face 4c of the display unit 4 and then passes through the prisms 5 and 6 whereafter it is reflected by the reflecting face 2a and visually observed as an image.

The third multiple image is formed from light emitted from the display unit 4 which passes through another face 6b of the correcting prism 6 and is then reflected by the face 6a and further by the face 6b of the correcting prism 6, whereafter it passes through the prisms 5 and 6 and is reflected by the reflecting face 2a and visually observed as an image. The fourth multiple image is formed from light emitted from the display unit 4 which passes through correcting prism 6 and is then reflected by the face 5a of the light intercepting prism 5 and further by the face 6b of the correcting prism 6, whereafter it passes through the prisms 5 and 6 and is reflected by the reflecting face 2a and visually observed as an image.

The fifth multiple image is formed from light emitted from the display unit 4 which passes through the prisms 5 and 6 and is then reflected by the reflecting face 2a and further by the face 5a of the light intercepting prism 5 whereafter it is reflected by the reflecting face 2a so that it is visually observed as an image. The sixth multiple image is formed from light emitted from the display unit 4 which passes through the prisms 5 and 6 and is then reflected by the reflecting face 2a, whereafter it passes through the light intercepting prism 5 and then through the face 6a of the correcting prism 6 and is then reflected by the face 6b of the correcting prism 6, and after then, it passes through the prisms 5 and 6 and is finally reflected by the reflecting face 2a so that it is visually observed as an image.

A principal cause of those multiple images resides in that the emergence angle $\phi$ of light emitted from the face 5a of the light intercepting prism 5 is almost equal to the emergence angles $\phi_1$ to $\phi_6$ of light which make the first to sixth multiple images MI1 to MI6 described above. Such multiple images MI1 to MI6 deteriorate the quality of a display image and make the driver feel disagreeable.

Figure 8:
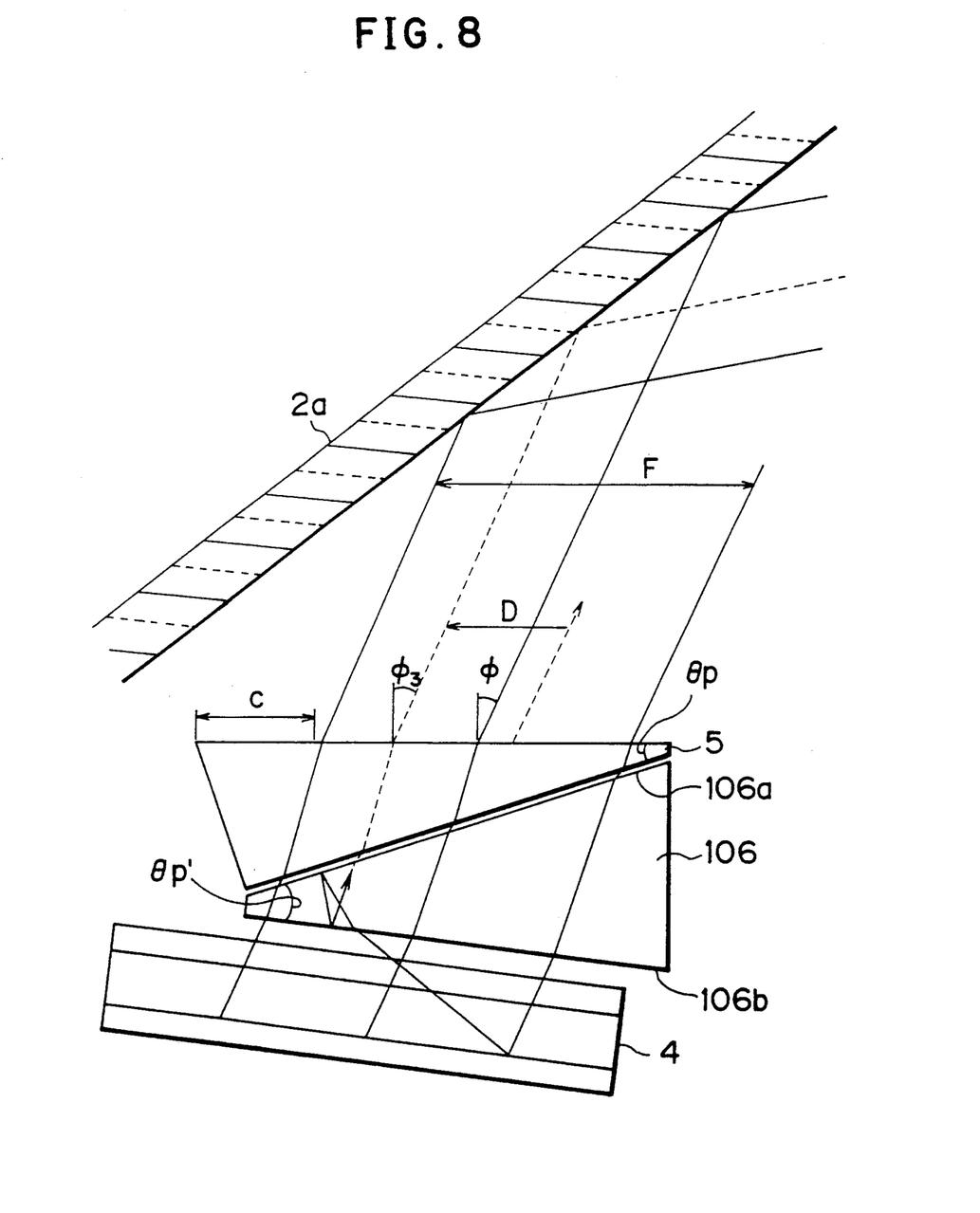
FIG. 8 is a diagrammatic representation showing a modified display apparatus.

FIG. 8 shows a modified or improved display apparatus which eliminates the problem of multiple images. In the modified display apparatus shown, the correcting prism 106 has a prism apex angle $\theta_P'$ which is about 1.5 times the prism apex angle $\theta_P$ of the light intercepting prism 5.

Since the cause of formation of disagreeable multiple images resides in that the emergence angle $\phi$ of light of the correct display image RI from the face 5a of the light intercepting prism 5 is substantially equal to the emergence angles $\phi_1$ to $\phi_6$ of light of the multiple images MI1 to MI6 as described above with reference to FIG. 7, third and fourth multiple images which may be formed with the present apparatus will be examined first.

Referring to FIG. 8, as for the third multiple image, an optical axis with which the relationship $\phi_3 \approx \phi$ stands is provided by a beam of light emitted from the display unit 4 which passes through a face 106b and is reflected by another face 106a and further by the face 106b of the correcting prism 106, whereafter it passes through the prisms 5 and 106 and comes to the reflecting face 2a. However, since the prism apex angle $\theta_P'$ of the correcting prism 106 is greater than the prism apex angle $\theta_P$ of the correcting prism 6 shown in FIG. 8, the optical axis is displaced by such a distance as indicated by an arrow mark D from the position of such optical axis indicated by a broken line in FIG. 8 that is provided when the correcting prism 6 is employed.

If the prism apex angle $\theta_P'$ is further increased to a value equal to two times or more the prism apex angle $\theta_P$, then the optical angle of the third multiple image which satisfies the condition $\phi_3 \approx \phi$ is displaced further leftwardly to a position outside the display image optical axis range F.

Figure 9:
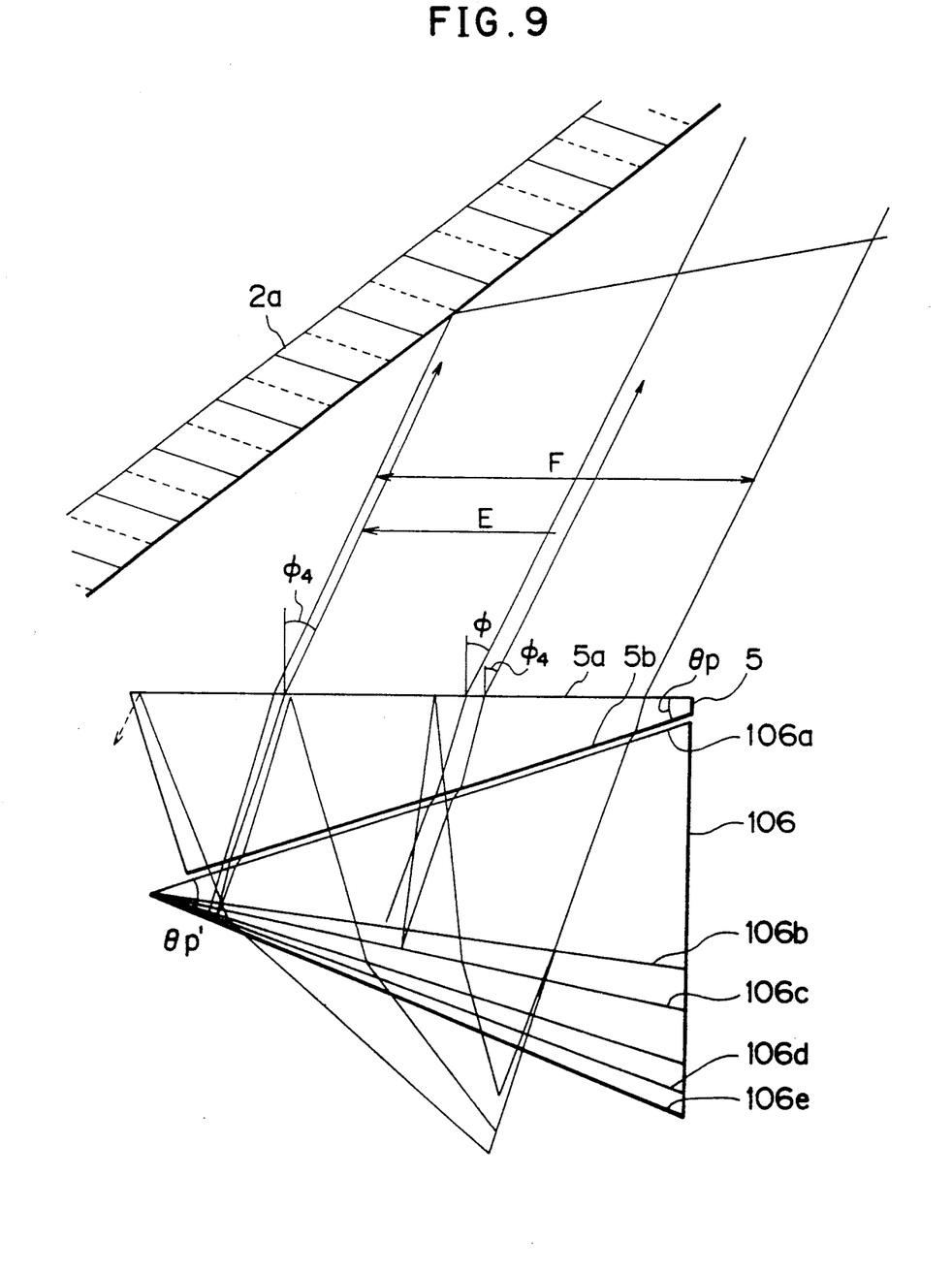
FIG. 9 is a diagrammatic representation illustrating ray tracing when the prism apex angle of the correcting prism is varied to various values.

Meanwhile, as for the fourth multiple image, an optical axis with which the relationship $\phi_4 \approx \phi$ stands is provided, in case the lower face of the correcting prism 106 is such as provided by a face 106c as shown in FIG. 9, by a beam of light emitted from the display unit 4 which passes through the correcting prism 106 and then through the face 5b of the light intercepting prism 5 and is reflected by the face 5a of the light intercepting prism 5, whereafter it passes through the prisms 5 and 106 and is reflected by the face 106c of the correcting prism 106, and after then, it passes through the prisms 5 and 106 and comes to the reflecting face 2a. If the prism apex angle $\theta_P'$ is further increased to a value greater than twice the prism apex angle $\theta_P$ so that the lower face of the correcting prism 106 comes to the position of a face 106d shown in FIG. 9, the optical axis is displaced by such a distance as indicated by an arrow mark E in FIG. 9 so that it comes to an end of the display image optical axis range F. If the prism apex angle $\theta_P'$ is further increased so that the lower face of the correcting prism 106 comes to the position of a face 106e, light reflected from the face 106e passes through the correcting prism 106 and is reflected by the face 5a of the light intercepting prism 5 whereafter it goes out through the remaining face of the light intercepting prism 5, and consequently, such light will not reach the eyes of the driver.

In other words, the requirement of $\phi \approx \phi_3$ or $\phi \approx \phi_4$ for the third or fourth multiple image to be visually observed by the driver is no more satisfied because the prism apex angle $\theta_P'$ is excessively great.

It is to be noted that the optical axis of the fourth multiple image shown in FIG. 7 does not come within the display image optical axis range F in FIG. 9, and accordingly, another optical axis is used here.

Figure 10A:
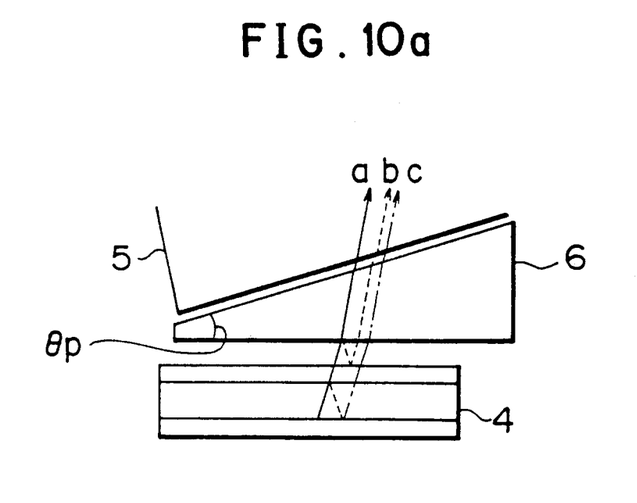
FIGS. 10a and 10b are diagrammatic representations illustrating ray tracing where the correcting prism has different prism apex angles.
Figure 10B:
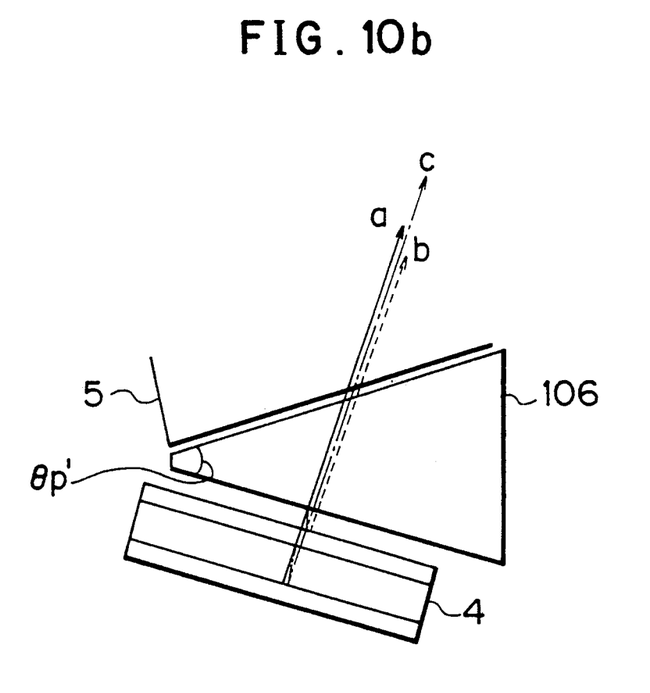

Meanwhile, as for the first and second multiple images, since the display unit 4 is inclined where the prism apex angle $\theta_P'$ of the correcting prism 106 is made greater as seen from FIG. 10b than the prism apex angle of such correcting prism 6 as shown in FIG. 10a, optical axes b and c of the first and second multiple images come close to an optical axis a of a correct display image. Consequently, although the first and second multiple images cannot be eliminated, they can be reduced significantly.

Further, as for the fifth and sixth multiple images, they can be eliminated by painting in black such a range of the face 5a of the light intercepting prism 5 as shown by an arrow mark C in FIG. 8.

Where the prism apex angle $\theta_P'$ of the correcting prism 106 is made greater than the prism apex angle $\theta_P$ of the light intercepting prism 5 in this manner, the driver cannot visually observe any multiple image and will have no disagreeable feeling. It is to be noted, however, that, strictly speaking, distortion of a display image will take place because of $\theta_P \neq \theta_P'$, but the distortion is not such distortion as will be recognized with the naked eyes. Accordingly, such distortion does not matter at all.

Having now fully described the invention, it will be apparent to one of ordinary skill in the art that many changes and modifications can be made thereto without departing from the spirit and scope of the invention as set forth herein.

What is claimed is:

1. A display apparatus for a vehicle having a dashboard and a windshield, said windshield having an opaque reflecting surface at a location adjacent said dashboard, said display apparatus comprising:
   a display unit, disposed in said dashboard, having a display face directed toward said windshield for displaying a display image thereon;
   a first prism having first and second mutually intersecting faces disposed substantially in an opposing relationship to said display face of said display unit such that light from said display unit is emitted through said prism toward said opaque reflecting surface which redirects said light to a visual point to provide a display of a display image, said first prism being disposed such that external incidence light within an external light incident range to said first face of said prism remote from said display unit is totally reflected by said second face of said prism adjacent said display unit to restrict an external incidence angle to said prism of light which can pass through said prism toward said display unit; and
   a second prism disposed between said display unit and said first prism such that the apex angles of said first and second prisms are directed opposite to each other to cancel refracting actions of said first and second prisms to light from said display unit with each other.

2. A display apparatus as claimed in claim 1, wherein said second prism has a prism apex angle substantially equal to a prism apex angle of said first prism.

3. A display apparatus as claimed in claim 1, wherein said second prism has a prism apex angle greater than a prism apex angle of said first prism.

4. A display apparatus as claimed in claim 3, wherein the prism apex angle of said second prism is a value within a range equal to the prism apex angle of said first prism to substantially twice the prism apex angle of said first prism.

5. A display apparatus as claimed in claim 2, wherein an air layer is provided between said first and second prisms.

6. A display apparatus as claimed in claim 2, wherein a portion of said first face of said first prism is painted in black so as to absorb light introduced thereto from said second face of said first prism.

7. A display apparatus as claimed in claim 1, wherein a remaining face of said first prism is painted in black so as to absorb light introduced thereto.

8. A display apparatus as claimed in claim 3, wherein an air layer is provided between said first and second prisms.

9. A display apparatus as claimed in claim 3, wherein a portion of said first face of said first prism is painted in black so as to absorb light introduced thereto from said second face of said first prism.

* * * * *